Patented July 4, 1950

2,513,389

UNITED STATES PATENT OFFICE 2,513,389

SOLID OXIDIZED POLYMER OF ALKYL PENTADIENE

David W. Young, Roselle, N. J., and John D. Calfee, Manhasset, N. Y., assignors to Standard Oil Development Company, a corporation of Delaware No Drawing. Application September 29, 1944, Serial No. 556,476

8 Claims. (Cl. 260—23.7)

This invention relates to polymeric materials; relates particularly to an oxidized high molecular weight olefinic polymer and relates especially to a polymeric material particularly suitable for use as a moulding resin, for a coating composition and as an additive or extender agent for synthetic rubber; and to the method of preparing the oxidized polymer.

It has been found possible to polymerize such higher olefins as methylpentadiene into relatively high molecular weight hydrocarbon soluble linear polymers. However, the resulting polymers are not in all respects as satisfactory as could be desired. It has been found extremely difficult or impossible to obtain molecular weights above about 45,000 and at this molecular weight, considerable tackiness remains which is objectionable for many purposes.

It is now found that in the presence of metallic oxidation catalysts such as compounds of cobalt, nickel, copper, iron, chromium and the like, the methyl pentadiene polymer or polymethyl pentadiene oxidizes readily to absorb from 0.5 to 28%, 30% or 35% by weight of oxygen and produces a resin which has a softening point (for the polymers that contain 20% to 28% by weight of oxygen) in the neighborhood of 130° C. to 150° C. This resin is highly advantageous for molding compositions since it has a good strength and no undue brittleness, no surface tack, and very low solubility in most solvents. Alternatively, the polymer may be prepared with cobalt compounds and combined with drying oil and the like to yield an extremely valuable coating film which shows high resistance to further oxidation, is somewhat elastic and provides an excellent surface protection.

Thus the process of the invention oxidizes polymerized methyl pentadiene or polymethyl pentadiene by the presence of cobalt compound catalysts or copper compound catalysts or nickel compound catalysts or the like, into an oxygen-containing resin of good strength and high durability, suitable for molding compositions, coating compounds, and the like. Other objects and details of the invention will be apparent from the following description.

The invention broadly consists in the catalyst oxidation by air or gaseous oxygen of a polymerized higher polyolefin such as polymethyl pentadiene by the application thereto of oxygen in the presence of an oxidation promoting catalyst such as cobalt compounds including the cobalt citrate complexes, or cobalt formate or cobalt tartrate complexes or cobalt chloride or cobalt linoleate or the like. The oxidation catalyst is incorporated into the polymer, and as thoroughly dispersed therein as possible. Thereafter the oxidation reaction occurs readily from atmospheric oxygen at room temperature; or at elevated temperatures, which produce higher rates of oxidation. The oxidation may be conducted on thin sheets of polymer into which the cobalt catalyst has been milled; or it may be conducted on solutions of the polymer containing the cobalt catalyst.

Thus the polymer such as polymethyl pentadiene having a molecular weight of from 15,000 to 45,000 or higher may be placed on the mill and from 0.1% to 2% of the cobalt catalyst such as the above mentioned cobalt citrate complexes may be added to the polymer, on the mill when the polymer is solid, otherwise in any convenient way. The polymer with the thoroughly dispersed catalyst in it may then when solid be sheeted out on the mill into as thin films as is convenient and the films may then be allowed to hang in air either at room temperatures or at elevated temperatures until the desired amount of oxygen has been absorbed. Thereafter the polymers may be utilized for whatever purposes are desired.

Alternatively, the polymethyl pentadiene may be dissolved in a hydrocarbon solvent such as a light naphtha, together with from 0.1% to 2% of the weight of solid polymer of cobalt catalyst as above pointed out; and the solution blown with air. As the oxidation proceeds, material containing substantial amounts of oxygen precipitates from the solution; from which it may be separated by filtration and dried. In this form it is an excellent moulding powder which softens at temperatures ranging from 90° C. to 150° C. (depending upon the percentage of oxygen combined into the polymer), and, especially under pressure, coalesces into a strong, hard resin. The clear resin varies in color from a light blue to a grey white.

To the powder of oxidized polymer, prior to the moulding operation there may be added any of the usual moulding material fillers such as the pigments and lakes, and a wide variety of other fillers including wood flour, ground cork, cotton linters, fabrics generally and the like to modify the appearance and strength of the resulting moulded article.

Alternatively the material which has been oxidized while in sheet form may be broken up into powder or small particles which likewise yield a very advantageous material for moulding, either as such, or with the above-mentioned fillers.

Alternatively, the polymethyl pentadiene containing the catalyst, whether prepared by milling the catalyst into the solid polymer or by dissolving the polymer, adding the catalyst and removing the solid, may be dissolved in such a substance as the so-called "vitolized" linseed oil (prepared by the Pittsburgh Plate Glass Co.). This material is a linseed oil from which certain portions have been removed to improve the solvent properties of the oil. As prepared this oil shows a Gardner viscosity of A to B; a weight per gallon of 7.45 lbs.; a non-volatile residue of 70%; an acid number of the oil equal to 6; a saponification value of 190; an iodine value of 165, and a clear fluid consistency. The polymerized methyl pentadiene is readily soluble in this "vitolized" linseed oil and the cobalt catalyst is readily added to this solution; which may be diluted by any of the ordinary paint thinners, and may have added thereto any of the ordinary paint pigments. The polymerized methyl pentadiene may be partially oxidized at the time of preparing the solution or it may be left substantially without oxygen. As so prepared the material forms an excellent paint compound which spreads readily under the brush or may be sprayed with a paint gun just as any other paint is applied. The resulting paint film dries quickly and the cobalt catalyst serves both for oxidation of the linseed oil and for oxidation of the polymer, to yield a paint film which is markedly superior to that obtainable from any of the ordinary varnish gums or resins or linseed oil, since the markedly higher strength of the oxidized polymerized methyl pentadiene greatly improves the strength and hardness of the paint film without making it brittle. In addition, a paint so prepared shows excellent adhesion not only to wood, but also to steel, zinc plate, tin, aluminum and the magnesium alloys, especially those known as "Dow Metals" which are difficult to paint with the ordinary paint compounds.

Polymerized methyl pentadiene, oxygen free, or containing not more than 1% to 2 or 5% of oxygen has been found to be highly soluble at room temperature in a number of solvents such as benzine, toluene, heptane, carbon tetrachloride, carbon disulfide and the mineral oils generally, as well as the halogenated hydrocarbons. Also, ordinary linseed oil or the above mentioned "vitolized" linseed oil may be added to the polymer on the double-roll mill up to a concentration of about 20% by weight. This solid solution of polymethyl pentadiene with linseed oil dissolves readily in a mixture of equal parts of benzine and heptane. From 0.1% to 0.5% of cobalt linoleate may be added to a 10% solution of the polymethyl pentadiene-linseed oil blend in the mixed solvents to yield an excellent paint base which may be used as a clear varnish or may be used after the addition of any desired pigment or lake or dye which is appropriate for paint use. The solvent mixture is easy to apply with a brush or spray gun and upon drying yields a hard, non-tacky, solvent insoluble type of resin film which is highly valuable.

The raw material for this invention is a methyl pentadiene polymer or polymethyl pentadiene which is readily prepared by a low temperature catalytic polymerization reaction. The preferred material is 2-methyl pentadiene-1,3. Alternatively, various other further substituted dienes of 6 to 8 carbon atoms may be used including such substances as 2,5-methyl pentadiene-1,3, 2-methyl-5-ethyl-pentadiene-1,3, or 2-methyl, 3-methyl-pentadiene 1-3, 5-ethyl pentadiene-1,3 and the like. Polyolefins having less than about 6 carbon atoms do not yield a polymer which is satisfactory for this invention since they do not oxidize with sufficient smoothness or readiness. However, any of the polyolefins having two or more double linkages to the molecule from 6 up to about 12 or 14 carbon atoms per molecule are useful for the production of the polymers used in the present invention. This olefinic material is cooled to a temperature ranging from $-40°$ C. to $-164°$ C. either by the use of a refrigerating jacket upon the reactor or by the addition to the olefin of an internal refrigerant such as liquid methane, or liquid ethylene, or liquid ethane, or liquid propane, or methyl chloride or liquid or solid carbon dioxide. To the cold diene there is then added a Friedel-Crafts catalyst. The methyl pentadiene may also be polymerized in methyl chloride solvent in a coil type reactor (externally cooled) as the polymer is soluble or solvated in methyl chloride at low temperatures. This solvation tends to give a clean reactor and ease of manufacture.

For the catalyst, any of the Friedel-Crafts catalysts shown by N. O. Calloway in his article on "The Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used. Of these catalysts, gaseous boron trifluoride is sufficiently powerful and is convenient to use. Alternatively, aluminum chloride in solution in a lower mono or polyhalogenated alkane, having a boiling point below 0° C., may be used as catalyst, these substances being non-complex forming, low-freezing solvents. Alternatively carbon disulfide may be used as solvent, or if double halides of the Friedel-Crafts metals are used, the lighter hydrocarbon solvents may be used. Alternatively, liquid titanium tetrachloride may also be used.

The catalyst, if gaseous, is simply bubbled through the cold olefinic material. If a liquid catalyst or catalyst solution is used, it is desirably applied in the form of a fine spray to the surface of the rapidly stirred olefinic material. To the present, it has not been found possible to use a solid catalyst, both because the solubility is too low to yield an active amount of catalyst, and because the solid catalyst forms a layer of polymer one molecule thick around the solid grains and no more is polymerized.

The polymerization reaction proceeds rapidly when the catalyst is applied, to yield the desired solid polymer which is readily recovered from the reaction mixture by volatilizing out any diluent or diluent refrigerant which may be present, or by dumping the whole polymerization mixture into warm water or warm naphtha which may, if desired, contain small quantities of alcohol, or the solid polymer may simply be lifted out or strained out of the polymerization material.

The polymer may then be washed, preferably on the mill, and dried, either on the mill or in a drying oven.

The resulting polymer may have a molecular weight ranging from about 15,000 to 45,000; polymers higher than 45,000 molecular weight being found to be extremely difficult to prepare.

Example 1

A quantity of 2-methyl pentadiene-1,3 was washed with 1 normal caustic solution, separated from the aqueous portion, dried over calcium chloride and distilled from metallic sodium to yield as pure a product as possible of the several isomers. The resulting material was found to have a boiling point at 760 mm. of Hg at 75° C. to 77° C., a density at 20° C. of 0.7113, and a refractive index for the D line at 20° C. of 1.4472. 100 parts by weight of this material were then placed in an insulation jacketed reactor with 300 parts of liquid ethylene. To this cold mixture there was then added, with vigorous stirring, 50 parts of liquid ethylene containing approximately 5% by weight of boron trifluoride. The reaction proceeded promptly to yield the desired polymer. The resulting polymerization mixture was discharged from the reactor into warm water and then the polymer was separated from the water and dried at room temperature.

A molecular weight determination by the Staudinger viscosity method showed the polymer to have a "molecular weight" or "Staudinger number" of 26,000.

The solid soluble polymer was treated on the double roll mill at 30° C. with approximately 0.15% of cobalt citrate complex, prepared according to the method given by M. Bobtelsky and A. E. Simchen in the Journal of the American Chemical Society for October 1942, being volume 64, page 2492, and sheeted out into comparatively thin films. After a substantial number of days of standing, the films were found to have broken up into a light blue powder, which upon analysis showed:

| | Per cent |
|---|---|
| Carbon | 67.37 |
| Hydrogen | 9.25 |
| Oxygen (by difference) | 23.38 |

No molecular weight determination could be made on the resulting oxidized polymer because of its insolubility in all of the available hydrocarbon solvents. The melting point of the resin was 150° C. This resin was placed in an injection moulding machine and the product at 170° C. was shaped into small buttons. The buttons when tested showed a tensile strength of 2,300 lbs. per square inch at 25° C. A portion of the oxidized polymer was ground, dispersed and solvated in the above mentioned vitolized linseed oil in which it was solvated to the extent of about 15%. In this solution also it produced an excellent protective coating when brushed on wood. The film was found to withstand extremely rough treatment without cracking, checking, peeling or loosening.

Example 2

Another portion of the polymethyl pentadiene, prepared as above described, was dissolved in toluene to produce a 15% solution to which there was then added 0.15% (on the polymer in the solution) of cobalt citrate complexes as oxidation catalysts. The solution was then blown with air for four days at room temperature. As the oxidation proceeded, portions of the oxidized polymer became insoluble in the toluene. The insoluble polymer was filtered out, washed with isopropyl alcohol and dried at room temperature. The resulting product was a light blue, hard resin powder, which upon analysis showed:

| | Per cent |
|---|---|
| Carbon | 64.2 |
| Hydrogen | 9.3 |
| Oxygen (by difference) | 26.5 |

A portion of the resulting powder was compounded on the roll mill with polyisobutylene having a molecular weight (according to the Staudinger method) of approximately 45,000. The oxidized polymer was found to be slightly compatible with polyisobutylene and effected in a concentration of 5% by weight a substantial reduction in the surface tackiness characteristic of polyisobutylene.

Another portion of the polymer was heated to a temperature of approximately 160° C. under moderate pressure to produce an excellent, clear, transparent sheet of polymer having a very faintly blue color from the presence of the cobalt catalyst. The transparent sheet of polymer was not tacky and it was insoluble in a number of foods, such as beer, chocolate and cheese.

A third portion of the oxidized polymer (containing 26.5% oxygen) was ground in vitolized linseed oil to a concentration of about 15% and a part of the solution was coated upon a piece of wood, upon which it was found to yield after two days an excellent clear, faintly blue varnish type film. Another part of this solution was combined with a substantial quantity of carbon black and spread upon another slab of wood, upon which it was found to yield an excellent film of black paint. Another portion of the oxidized polymer powder was mixed with ground cork and heated under pressure, to a temperature of approximately 150° C. The polymer was found to be an excellent binder for ground cork which made an excellent oilproof gasket.

Example 3

Another portion of the oxidized polymer powder was combined with mica splittings and heated to approximately 160° C. under a moderately heavy pressure. The polymer melted and spread over the mica. The material was then cooled to room temperature and the polymer was found to be solidly adherent to the mica and oil resistant and heat resistant in a most satisfactory manner, yielding an excellent built-up mica insulation for electrical equipment.

Example 4

A portion of polymethyl pentadiene was treated on the mill with 0.2% of cobalt citrate complex, sheeted out into thin films and allowed to stand in air at room temperature for a few hours only. The sheets or films were then broken up, and washed in a corrosion-resistant kneader with 10% hydrochloric acid solution. The washing was conducted for approximately one hour and the catalyst was removed to such an extent that no more was detectable by ordinary analysis. The resulting polymer showed upon analysis 1.8% of oxygen and 0.00% cobalt, showing that residual traces of cobalt, if any, were extremely small. The polymer containing 1.8% of oxygen was soluble in hydrocarbon solvents and showing a Staudinger molecular weight of 32,000. This material was found to be compatible with the low temperature interpolymer of isobutylene with polyolefins such as isoprene of the type shown in U. S. Patent No. 2,356,128 known as "Butyl"; the polymer containing approximately 1.5% of isoprene with the isobutylene being known as "Butyl GR-I" grade. When so compounded into the butyl it was found to be an excellent extender and to yield substantial and valuable gains in modulus, tensile strength and the like. These values are shown in the following table. The material was compounded according to the following recipe:

TABLE I

*Synthetic rubber mixtures with sulfur, etc.*

| | A | B |
|---|---|---|
| | Parts | Parts |
| GR-I (Butyl)+10% by wt. of 32,000 m. wt. oxidized polymethyl pentadiene | | 100 |
| GR-I (Butyl rubber) | 100 | |
| Zinc Oxide | 5 | 5 |
| Stearic Acid | 3 | 3 |
| Tuads (Tetra Methyl Thiuramdisulfide) | 1 | 1 |
| Captax (2-Mercapto benzothiozole) | 0.5 | 0.5 |
| E. P. C. Black (Easy processing channel black) | 50.0 | 50.0 |
| Sulfur | 2.0 | 2.0 |

Portions of these compounds were then placed in moulds and cured at 307° F. for varying times, whereafter test samples were cut from the cured material.

Before curing the material had a Williams plasticity as shown in the following table:

TABLE II

| | A | B |
|---|---|---|
| Williams Plasticity-Recovery at 70° C., 5 Kg. Compound | 145–23 | 152–21 |

These results show the improvement in plasticity obtainable by the addition of the oxidized polymer.

After curing for 20, 40, 60 and 90 minutes at 307° F., test samples cut from the cured portions showed the following tensile strength, moduli at 300% elongation, and per cent elongation at break as set forth in the following table:

TABLE III

| | A | | | B | | |
|---|---|---|---|---|---|---|
| | Tensile | Modulus at 300% | Elong., per cent | Tensile | Modulus at 300% | Elong., per cent |
| Cure at 20' at 307° F | 2,785 | 375 | 860 | 2,050 | 650 | 730 |
| Cure at 40' at 307° F | 2,715 | 565 | 730 | 2,000 | 785 | 670 |
| Cure at 60' at 307° F | 2,740 | 605 | 730 | 1,990 | 765 | 690 |
| Cure at 90' at 307° F | 2,640 | 760 | 650 | | | |

These results show that GR-I grade Butyl rubber when compounded with 10% by weight of the oxidized polymethyl pentadiene or methyl pentadiene polymer has an improved cure-rate as indicated by the improvement in modulus. This higher modulus with a shortened curing time is of very great value especially in the manufacture of automobile tire inner tubes. In addition, the mixture containing the oxidized polymethyl pentadiene has a markedly improved raw stock strength as indicated by the higher Williams plasticity, greatly facilitating the manufacture and handling of inner tubes prior to the curing step.

Thus the product of the invention is an oxidized olefinic polymer showing an extremely high resistance to further oxidation, forming a strong, tough, hard resin suitable for moulding compositions or protective films, or cementing purposes.

While there are above disclosed but a limited number of embodiments of the process of the invention, it is possible to provide still other embodiments without departing from the inventive concept herein disclosed and claimed.

The invention claimed is:

1. A solid, resinous oxidation product of a solid homopolymer of a conjugated branched-chain alkyl pentadiene of 6 to 8 carbon atoms per molecule having a Staudinger molecular weight between 15,000 and 45,000, said homopolymer being prepared by application to the alkyl pentadiene of a Friedel-Crafts catalyst solution at a temperature between −40° C. and −164° C.; said oxidation product being characterized by a softening point between 90° C. and 150° C. and by a combined oxygen content ranging from 1 to 28%.

2. A solid, resinous oxidation product according to claim 1 wherein the homopolymer has a Staudinger molecular weight of about 26,000 and is prepared by polymerization of 2-methyl pentadiene-1,3.

3. A solid, resinous oxidation product according to claim 1 wherein the alkyl pentadiene is 2,5-dimethyl pentadiene-1,3.

4. A solid, resinous oxidation product according to claim 1 wherein the alkyl pentadiene is 2-methyl-5-ethyl pentadiene-1,3.

5. A linseed oil-soluble, solid, resinous oxidation product of a solid homopolymer of 2-methyl pentadiene-1,3 having a Staudinger molecular weight between 15,000 and 45,000, said homopolymer being prepared by application to the methyl pentadiene of a Friedel-Crafts catalyst solution at a temperature between −40 and −164° C.; the said oxidation product being characterized by a softening point between 130° C. and 150° C. and by a combined oxygen content of 20 to 28%.

6. A process which comprises mixing a metallic oxidation catalyst with an inherently solid homopolymer of a conjugated branched-chain alkyl pentadiene of 6 to 8 carbon atoms per molecule having a Staudinger molecular weight between 15,000 and 45,000, said homopolymer being prepared by applying a Friedel-Crafts catalyst solution to alkyl pentadiene monomer at a temperature between −40° C. and −164% C.; and oxidizing the said polymer with an oxygen-containing gas until a resinous product is obtained which inherently possesses a softening point between 90 and 150° C. and which is characterized by a combined oxygen content between 1 and 28 weight percent.

7. A process which comprises mill-mixing 0.1 to 2 weight percent of a cobalt oxidation catalyst into a solid homopolymer of 2-methyl pentadiene-1,3 having a Staudinger molecular weight between 15,000 and 45,000 and prepared by applying a boron trifluoride catalyst solution to the methyl pentadiene monomer at a temperature between −40° C. and −164° C., and oxidizing the solid polymer containing the oxidation catalyst with oxygen until a resin is obtained which has a softening point between 130° C. and 150° C. and a combined oxygen content between 20 and 28 weight percent.

8. A process which comprises dissolving in linseed oil a solid homopolymer of 2-methyl pentadiene-1,3 having a Staudinger molecular weight between 15,000 and 45,000 and prepared by applying an aluminum chloride catalyst solution to methyl pentadiene monomer at a temperature between −40° C. and −164° C.; dispersing 0.1 to 2 weight percent based on the polymer of a cobalt oxidation catalyst in the solution of polymer in linseed oil; spreading the resulting dispersion in the form of a thin film and drying the film by air oxidation, whereby the methyl pentadiene polymer is oxidized into a resinous product having a combined oxygen content between 1 and 28 weight percent.

DAVID W. YOUNG.
JOHN D. CALFEE.

REFERENCES CITED

The following references are of record in the file of this patent:

UNITED STATES PATENTS

| Number | Name | Date |
|---|---|---|
| 1,891,203 | Ambros et al. | Dec. 13, 1932 |
| 1,901,045 | Schmidt | Mar. 14, 1933 |
| 2,122,826 | Van Peski | July 5, 1938 |
| 2,142,980 | Huijser et al. | Jan. 3, 1939 |
| 2,273,880 | Mitchell | Feb. 24, 1942 |
| 2,339,958 | Sparks | Jan. 25, 1944 |
| 2,361,018 | Gerhart | Oct. 24, 1944 |